US011522875B1

United States Patent
Levin et al.

(10) Patent No.: US 11,522,875 B1
(45) Date of Patent: Dec. 6, 2022

(54) SECURITY BREACHES DETECTION BY UTILIZING CLUSTERING OF WEIGHTED OUTLIERS

(71) Applicant: ShieldIOT, Herzliya (IL)

(72) Inventors: Ohad Levin, Haifa (IL); Dan Feldman, Haifa (IL)

(73) Assignee: ShieldIOT Ltd., Herzliya (IL)

( * ) Notice: Subject to any disclaimer, the term of this patent is extended or adjusted under 35 U.S.C. 154(b) by 31 days.

(21) Appl. No.: 16/586,985

(22) Filed: Sep. 29, 2019

Related U.S. Application Data

(60) Provisional application No. 62/748,462, filed on Oct. 21, 2018.

(51) Int. Cl.
*H04L 9/40* (2022.01)
*G06F 16/35* (2019.01)
*G06F 16/904* (2019.01)

(52) U.S. Cl.
CPC .......... *H04L 63/1416* (2013.01); *G06F 16/35* (2019.01); *G06F 16/904* (2019.01); *H04L 63/0884* (2013.01); *H04L 63/1425* (2013.01)

(58) Field of Classification Search
CPC . H04L 63/0884; H04L 63/102; H04L 63/104; H04L 63/1408; H04L 63/1416; H04L 63/1425; H04L 63/1433; H04L 63/1441; G06F 16/35; G06F 16/45; G06F 16/55; G06F 16/904
See application file for complete search history.

(56) References Cited

U.S. PATENT DOCUMENTS

| 8,242,955 | B2 * | 8/2012 | France | G01S 19/40 |
| | | | | 342/357.59 |
| 10,326,787 | B2 * | 6/2019 | Wolkov | G06F 30/20 |
| 10,749,883 | B1 * | 8/2020 | Martin | G06F 21/554 |
| 2006/0161592 | A1 * | 7/2006 | Ertoz | G06F 21/552 |
| 2012/0054184 | A1 * | 3/2012 | Masud | G06F 16/285 |
| | | | | 707/E17.091 |
| 2014/0165198 | A1 * | 6/2014 | Altman | H04L 63/1408 |
| | | | | 726/23 |
| 2015/0242626 | A1 * | 8/2015 | Wang | G06F 21/561 |
| | | | | 726/23 |
| 2016/0028750 | A1 * | 1/2016 | Di Pietro | H04L 63/1425 |
| | | | | 726/23 |

(Continued)

OTHER PUBLICATIONS

Daniel Puschmann et al, Marginal Distribution Clustering of Multi-variate Streaming IoT Data, IEEE (Year: 2016).*

(Continued)

*Primary Examiner* — Shanto Abedin
(74) *Attorney, Agent, or Firm* — William H. Dippert; Laurence A. Greenberg; Werner H. Stemer

(57) ABSTRACT

There may be provided a method for detecting a cyberattack, the method may include receiving, by a computerized system, a first data set receiving or generating, by the computerized system, a second data set that comprises one or more cluster centroids associated with one or more internet of things cyberattacks; and related to behavior of multiple internet of things devices; determining relationships between outliers that belong to the first data set and the one or more cluster centroids; and determining whether the first data set is indicative of the one or more cyberattacks based on the relationships.

10 Claims, 6 Drawing Sheets

(56) References Cited

U.S. PATENT DOCUMENTS

| | | | |
|---|---|---|---|
| 2016/0094577 A1* | 3/2016 | Shih | H04L 63/1425 |
| | | | 726/25 |
| 2016/0149936 A1* | 5/2016 | Pegna | H04L 63/1425 |
| | | | 726/23 |
| 2017/0055913 A1* | 3/2017 | Bandyopadhyay | A61B 5/7246 |
| 2017/0134401 A1* | 5/2017 | Medvedovsky | H04L 63/1425 |
| 2018/0288063 A1* | 10/2018 | Koottayi | H04L 63/102 |
| 2018/0375887 A1* | 12/2018 | Dezent | H04L 67/30 |
| 2019/0141066 A1* | 5/2019 | Shivamoggi | G06F 21/56 |
| 2020/0112571 A1* | 4/2020 | Koral | G06N 3/08 |
| 2021/0227014 A1* | 7/2021 | Bou | H04L 65/80 |

OTHER PUBLICATIONS

ε-Coresets for Clustering (with Outliers) in Doubling Metrics, Lingxiao Huang et al., arXiv (Year: 2018).*

Machine translation of Chinese patent application No. CN 107249000 A, Jun-long Zhu et al (Year: 2017).*

Tianqi Yu et al, Recursive Principal Component Analysis-Based Data Outlier Detection and Sensor Data Aggregation in IoT Systems, IEEE (Year: 2017).*

* cited by examiner

SECURITY BREACHES DETECTION BY UTILIZING CLUSTERING OF WEIGHTED OUTLIERS

FIELD OF THE INVENTION

The present invention generally relates to detecting cyberattacks in high scale IoT networks and more specifically, relates to utilizing anomaly detection to identify cyberattacks carried out in computerized devices communicating over high scale Internet of Things (IoT) networks.

BACKGROUND OF THE INVENTION

With the growth of networked computer systems, multiple devices have been coupled over a network to control, manage and operate computerized tasks. In multiple cases, holding one system which controls and manages the security in an inspected network with multiple inspected computers seemed to be a good approach. The approach of employing one dedicated system for large network of critical machines for offloading the security operational tasks to this system has multiple benefits. Yet, in some cases, the security operational tasks conducted by a dedicated system required involvement of the inspected computerized devices communicating over the network. One of the challenges manifested by this approach is with the number of devices a single and central system manages. In some cases, with such an approach, the detection of a security issue may last a long time which jeopardizes the health of the network and the devices communicating over this network.

The use case of IoT devices, wherein a single and light device provided in a small form factor can be dedicated to a relatively narrow set of tasks, led to a requirement of multiple devices controlling a large set of industrial devices such as sensors, cameras, recorders, and more. With IoT devices, the security central systems controlling and enforcing the security policies are required to detect security issues by managing an enormously growing number of tasks, operations, and alerts. In many cases, detecting a security issue requires to receive information, conduct probation on the data, communicating with the suspect device, and more. In some cases, a network may comprise a large number of devices communicating with each other, or with the central system. Thus, the task to complete a security detection in a reasonable time window in order to minimize the impact of the security issue, becomes challenging.

SUMMARY OF THE INVENTION

The present invention is directed towards a system and method designed to identify cyberattacks in high scale IoT networks by utilizing anomaly detection in data records captured from a plurality of remote computerized devices operating IoT technology. Such devices operating IoT technology are denoted herein as IoT devices. The data records obtained from the IoT devices and representing behavior of the IoT devices communicating over a communication network can be captured over an extended period of time. The communication and operation behavior may be represented by data records referring to the operational activities of the IoT devices, and/or to the communication technique and methods thereof. For example, data records referring to the operational activities on the IoT devices may comprise values related to activities such as, start communicating time, stop communicating time, session key used for communication, port utilized for communication, ID of target device communicated with the IoT device, number of TCP/IP packet sent, number of TCP/IP packets received, Upload Content, Length, number of bytes received, number of bytes sent, and the like.

The anomaly detection utilized by the system disclosed in the present invention, may be conducted by a computerized process to identify outliers and then classify the identified outliers to known cyberattacks. The cyberattack classified in the present invention can be any type of offensive maneuver that targets computerized devices such as IoT devices, information systems, infrastructures, computer networks, or personal computer devices. The cyberattacks classified by the system disclosed in the present invention can be malicious actions that involve computerized devices and networks.

In some embodiments of the present invention, the system operating the anomaly detection may conduct a preprocessing procedure designed to clean and prepare data sets received from IoT devices. In some cases, the system may be configured to communicate with at least three (3) IoT devices and capture data sets with data records related to the IoT devices' behaviors. In some other cases, the system may access a memory interface for receiving data related to the IoT devices' behaviors which may be stored in a computer readable medium. The preprocessing procedure may comprise a process for identifying the data records in a received data set which are complied with a predefined data format. In some cases, the preprocessing procedure may also comprise a removing process for removing the data records in the data set which are not compliant with the predefined data format.

In some embodiments of the present invention, the system operating the anomaly detection may also conduct a method for calculating Normality Score on the data sets captured from IoT devices, after performing the preprocessing procedure on the received data sets. Any reference to a centroid should be applied mutatis mutandis to a set of one or more centroids. The system may utilize a centroid for received a data set and a predefined threshold distance defining the desirable distance from the centroid for the anomaly detection. Thus, the distance from the centroid may be a numeric value, or a set of numeric values representing a length on a graph from a data record in the group to the center of mass of said group. The system may also utilize an iterative process which begins with a step of defining a group of records in the data set and removing from the data set the data records of the defined group of records having a distance from the centroid which is smaller than the predefined threshold distance. The iterative process may also have a step of associating a "normality score" to the data records in the defined group of data records according to the number of data records in the data set. The iterative process may continue with the process of defining a new centroid for the records remained in the defined group of data records, removing from the data set the data records having a distance from the centroid which is smaller than the predefined threshold distance and associating another "normality score" to the data records in the defined group, according to the number of records remained in the data set. The iterative process may continue till the data set is empty. By the end of the iterative process, the records which initially were in the data set, are associated with a "normality score".

In some embodiments of the present invention, the system operating the anomaly detection may also construct a core-set of weighted records that is an approximation of the original data set, with a given limited error. The computed core-set may be utilized to perform an outlier detection procedure in a scale shorter execution time. In some cases, the system operating the anomaly detection may also conduct a process for classifying and label the anomalies with cyberattack categories. In some cases, the classification process may occur to a portion of the identified outliers. In some cases, such a portion comprises all the identified outliers. The classification process may comprise comparison of the data records identified as outliers labeled with cyberattacks and thereby identify whether the identified outliers indicate cyberattacks. In some cases, the classification process may also be configured to label the outlier according to the cyberattack types thereof.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable by a computerized system for identifying cyberattacks in data records captured from IoT devices by identifying outliers in a statistically fashion. The data records obtained from the IoT devices and representing behavior of the IoT devices. As used in the specification the term "data record" is used to define the data values captured from the IoT devices. In some cases, the term "record" is also used to define this value. The data records can be arranged in group denoted as "data set".

Internet of Things (IOT) may be regarded as the extension of Internet connectivity into physical devices and everyday objects. Embedded with electronics, Internet connectivity, and other forms of hardware (such as sensors), these devices can communicate and interact with others over the Internet, and they can be remotely monitored and controlled.(wikipedia.org)

The definition of the Internet of things has evolved due to convergence of multiple technologies, real-time analytics, machine learning, commodity sensors, and embedded systems.[5] Traditional fields of embedded systems, wireless sensor networks, control systems, automation (including home and building automation), and others all contribute to enabling the Internet of things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

Figure 1:
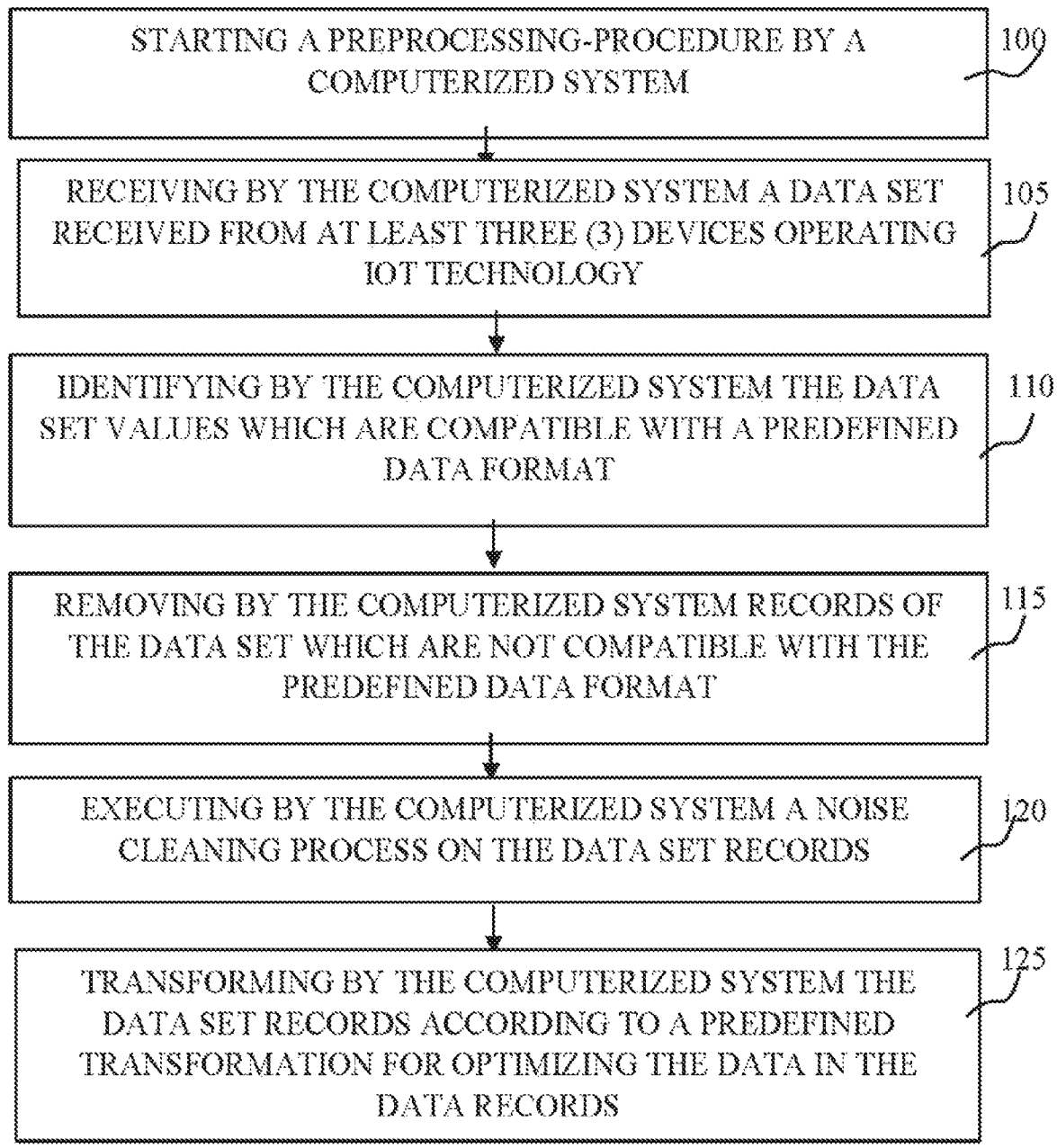
FIG. 1 discloses a computerized process denoted as a preprocessing-procedure designed to receive and prepare data from IoT devices for anomaly detection, according to exemplary embodiments of the present invention.

FIG. 1 discloses a computerized process denoted as a preprocessing-procedure designed to receive and prepare data from IoT devices for anomaly detection, according to exemplary embodiments of the present invention. At step 100 a computerized system may start the preprocessing-procedure. Such a computerized system may be an application software operable on a computerized unit or/and a computerized device comprising a memory unit coupled with a processing unit. The memory unit may be a computer-readable storage medium configured for storing data accessible by the central application software for processing the stored data. The processing unit may comprise at least one digital processor instructed to execute methods and process of the central application software.

At step 105 the computerized system may receive data sets from at least three (3) IoT devices. In some cases, the computerized system may be connected to a computer-readable medium comprising captured data representing behavior of the IoT devices communicating in a telecommunications network. The communication and operation behavior related data may be captured data referring to the communication and operation behavior of the IoT devices. In some cases, such data may comprise the communication-session key, Service ID, headers of the communication packet, content downloaded or uploaded by the device, number of bytes sent from a device, communication response time, the protocol utilized by the devices for communications, time stamp of initiating the communication, and the like. In some cases, the captured data may be captured by a computerized system designed to communicate with the devices and request the data therefrom. In some other cases the devices may be configured to automatically send the communication and operation behavior related data to a computer connected to a computer-readable medium designed to capture data in a computer readable format. In some cases, such data sets may be structured from large files and tables designed to be utilized by computerized processes. In some other cases the communication and operation behavior can be obtained by tapping the communication traffic at the network operator data center and communicated to computerized system hereof.

At step 110 the computerized system may identify the values in the received data sets which are compatible with a predefined data format. The predefined data format may be such, textual data, time and/or date, numeric data, tables, and the like. For example, the data sets are structured in tables preconfigured to accommodate such values of such data sets. In such exemplary case, the predefined data format can be a table presenting numeric values with 2 decimal places only. Thus, the computerized system may identify the values in the data sets which are structured as numeric values with 2 decimal places only. At step 115 the computerized system may remove data records comprising values which are not compatible with the predefined data format. For example, in case a data record comprising textual characters and the predefined data format is structured with numeric values only, the data record comprising the textual characters may be removed by the computerized system. At step 120 the computerized system may execute a noise cleaning process on the identified data records in the data sets. The noise cleaning process may comprise removing fields and values in the data set which are compatible with the required format but represent noisy data. For examples, the noise cleaning process can remove lines with mostly empty values, lines with fields values which have no numerical meaning, and the like.

At step 125 the computerized system may transform the data set records according to a predefined transformation for optimizing the data in the data sets for the calculation of the Normality Score method. In some cases, the computerized system may remove some of the columns, create new columns, transform category fields to multiple Boolean fields, enrich the data with external data feeds and the like.

Figure 2A:
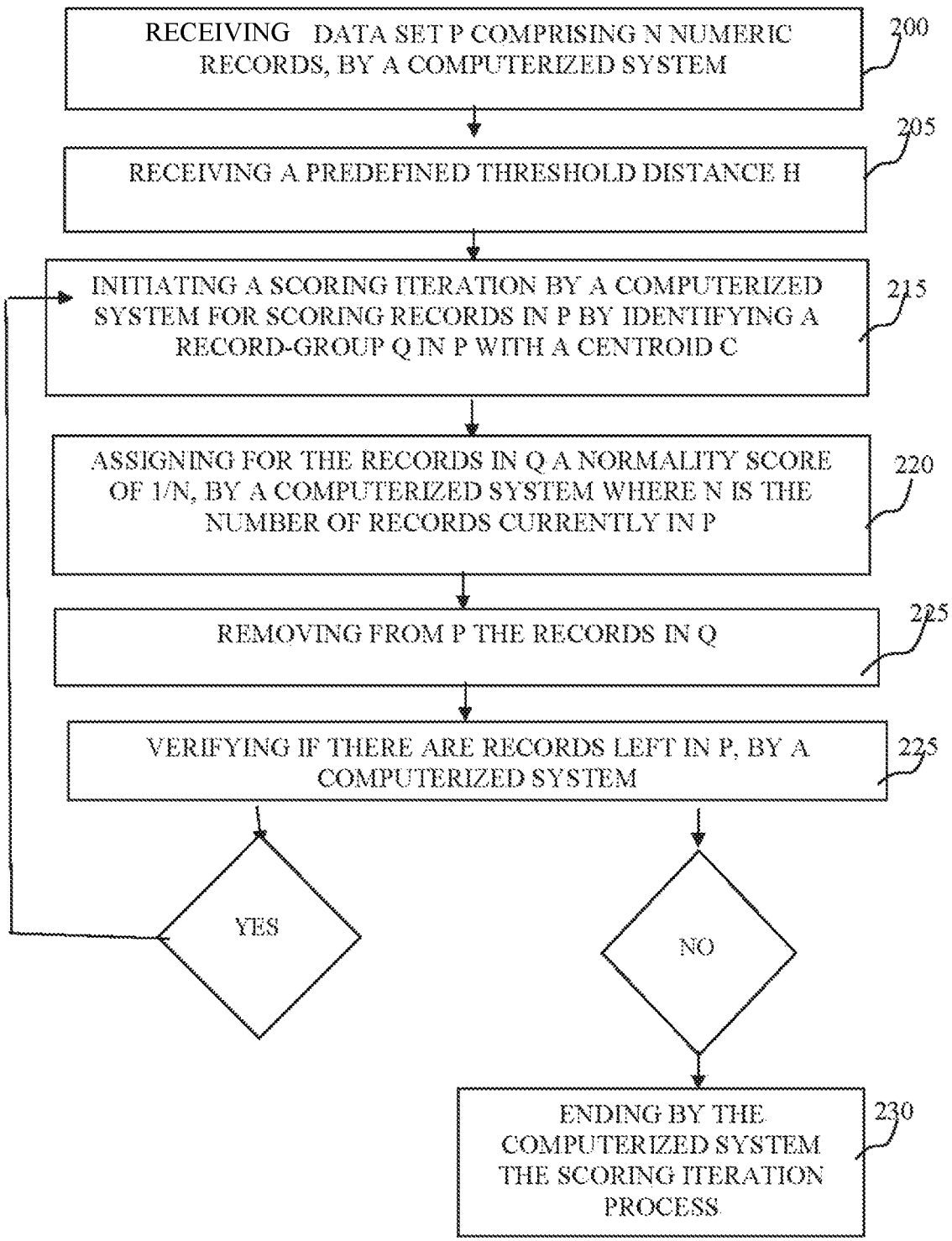
FIG. 2A discloses a method operable by a computerized system for calculating Normality Score on a set of data records captured from devices operating IoT technology, according to exemplary embodiments of the present invention.

FIG. 2A discloses a method operable by a computerized system for calculating Normality Score on a set of data records captured from IoT devices, according to exemplary embodiments of the present invention. At step 200 a computerized system may receive a data set denoted as data set P. Such a data set P may comprise data representing network activity of IoT devices communicating with the network. In some cases, the data set P may comprise data arranged and constructed by the preprocessing-procedure as aforementioned. The computerized system may comprise an interface designed to receive data sets such as data set P. For example, the computerized system may be configured to present a dedicated interface which can be utilized by a person or a computerized process, to load data sets such as data set P to the computerized system. In some embodiments of the present invention, the computerized system may be configured to receive the data set P, in an automatic fashion. For example, the computerized system may access a computer-readable medium comprising the data set P and then read the data set P. In some cases, the computer-readable medium may be embedded with the computerized system. In some other cases, the computer-readable medium may be accessed via a telecommunications network. Such a telecommunications network may be the internet, local area network, wireless-based networks, and the like.

At step 205 the computerized system may receive a numeric value H defining a threshold distance. In some cases, the threshold distance H may be utilized to calculate the normality score of data records in P.

In some cases, H may be precalculated and configured by a user utilizing and operating the computerized system.

At step 215 the computerized system initiates a process, denoted as scoring iteration, for scoring the data records in P. Thus, the computerized system may utilize the data set P to identify a group of data records in P, denoted as Q, with a centroid C.

The centroid C is defined as the center of mass of the numeric group Q, which in some cases, may be a geometric center of all data records in Q.

Thus, the centroid is the data record which minimizes the distance from all the data records in P without the data records with distance larger than H.

The data records to be removed may be found in an iterative manner.

For example—during each iteration some of the data records in P are removed to provide a reduced set of data records. The data records to be removed may be selected as those that once removed, fulfill a certain condition. For example—the certain condition may be minimizing the sum of square distances of the data records that were not removed (or at least those without the data records with distance larger than H) from the centroid C.

In some cases, the centroid may be defined by a computerized process utilizing methods and processes to define the centroid C. In some other cases, the computerized system may utilize a computerized method to calculate C. In some cases, the cluster represented by Q with the centroid C may be calculated by utilizing cluster analysis algorithms, such as k-means algorithm.

In some embodiments of the present invention, the scoring iteration can be configured to identify more than one (K) centroid C in P. For example, the scoring iteration can be configured to identify a group of data records Q1 with centroid C1, a group of data records Q2 with centroid C2, a group of data records Q3 with centroid C3. There may be any number (K) of centroids. The number (K) of centroids may be determined in any manner.

When K exceeds one (K>1) the data records to be removed may be found in an iterative manner.

For example —during each iteration some of the data records in P are removed to provide a reduced set of data records. The data records to be removed may be selected as those that once removed, fulfill a given condition. For example—the given condition may be minimizing the a sum of square distances of the data records that were not removed (or at least those without the data records with distance larger than H) from each one of the K centroids.

Thus, the scoring iteration process can be configured to identify a group of data records Qm with the corresponding centroid Cm, wherein the index M defining the serial number of the data group and the corresponding centroid thereof, is technically not limited.

In such an exemplary case, the centroid may be defined by a computerized process utilizing methods and processes to define the centroids Cm of Qm. In some other cases, the computerized system may utilize a computerized method to calculate Cm of Qm.

At step 220 the computerized system defines for a portion of data records in Q a "normality score" defined as 1/N, wherein N is the number of data records in P at the current iteration. In some cases, such a data record portion defined with "normality score" may be all the data records in Q.

Thus, the data records in Q are associated with the "normality score" corresponded to the number of records in P in the current iteration.

At step 225 the computerized system may be instructed to remove the data records in Q from P. At step 235 the computerized system may verify if there are any data records left in P. In such a case, wherein data records in P can be found, the computerized system may be instructed to re-initiate the scoring iteration according to the instructions at step 215.

Thus, the computerized system may identify a certain number of data records Q with a newly identified centroid C and continue with the process as aforementioned. The computerized system may perform the iterations according to instructions as defined from step 215 to step 225. The computerized system may also be instructed to continue to step 230, in case P is empty after verifying P at step 225.

At step 230 the data set P may be empty. In such cases, the data records which are removed from P may be associated with "normality scores". For example, in case P comprises a hundred thousand (100,000) data records, at step 215 as aforementioned. The "normality score" of the data records in Q may be one divided to one hundred thousand ($1/100,000$). In such exemplary case, if the number of data records in P, after one iteration of the scoring data records, is ten thousand (10,000), the "normality score" of the data records in the newly calculated Q, at step 220, may be set to one divided to ten thousand ($1/10,000$). By accomplishing step 230 the computerized system may end the scoring iteration. In some cases, the computerized system may store the data records associated with the "normality scores" thereof, in a computer-readable medium. In some other cases, the computerized system may output the data records associated with the "normality scores" as a paper print.

Figure 2B:
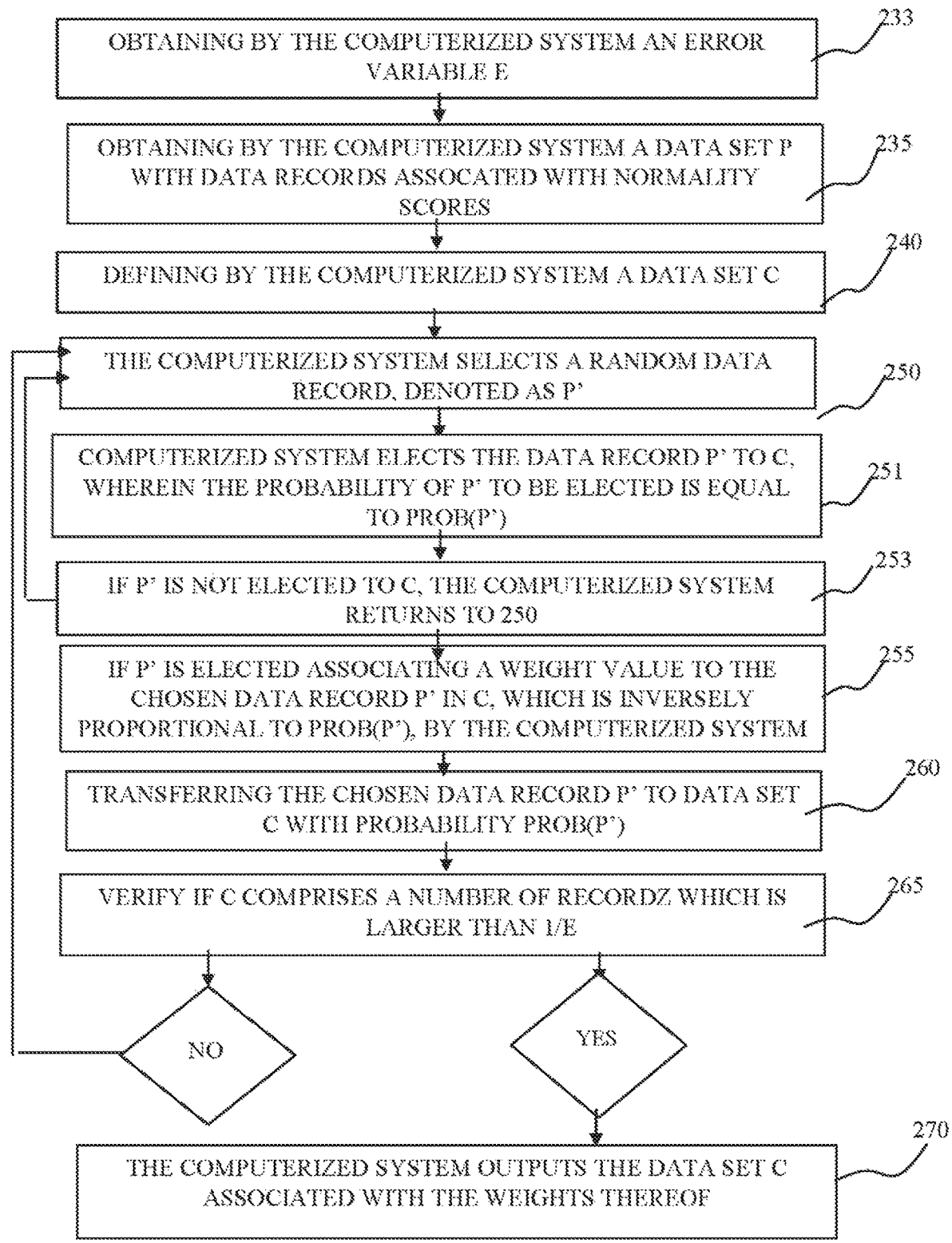
FIG. 2B discloses a method operable by a computerized system for utilizing a given approximation to identify weighted set of data records (core-set) representing a data set captured from IoT devices, according to exemplary embodiments of the present invention.

FIG. 2B discloses a method operable by a computerized system for utilizing a given approximation to identify weighted set of data records (core-set) representing a data set captured from IoT devices, according to exemplary embodiments of the present invention. At step 233 the computerized system may receive a numeric value ε. Such a value ε may be utilized in cluster analysis for constructing a weighted set of data records(core-set) from data set P, as explained below. In some cases, ε may be provided by a user utilizing and operating the computerized system. In some other cases, ε may be provided in an automatic fashion, by a predefined value residing in the computerized system.

At step 235 the computerized system may obtain a data set P comprising data records associated with "normality scores". In some cases, P may be obtained via a dedicated interface such as a user graphic interface. In some other cases, P can reside in a computer-readable medium configured with the access interfaces required by the computerized device for reading the data structure of P and the "normality scores" associated with the data records in P. At step 240 the computerized system generates a data set denoted as data set C. In some cases, data set C may be an empty data set structure to accommodate data records from the data set P. At step 250 the computerized system selects a random data record, denoted as p' from the data set P. At step 251 the computerized system elects the data record p' to C, wherein the probability of p' to be elected is equal to prob(p'), and wherein prob(b) is the Normality Score associated to p'. If p' is not elected to C the system may repeat steps 250 and 251 hereof. At step 253 if p' is not elected to c, the computerized system returns to 250.

At step 255 if p' is elected the computerized system may associate a weight value to the chosen data record p' in C, wherein the weight value is inversely proportional to prob (p'). Such a weight value of the data record p', denoted as W(p'), wherein the probability to be chosen to the core-set is prob(p'), can be calculated as W(p')=1/prob(p'). At step 260 the computerized system transfers the chosen data record p' from P to data set C.

At step 265 the computerized system calculates the numeric value 1/ε and verify if the data set C comprises a number of data records which is not larger than 1/ε. In case the number of data records in the data set C is below 1/ε, the computerized system may repeat the processes described from step 250 to step 255. Thus, the computerized system may be instructed to identify 1/ε data records in the data set C associated with weight W(p'). In such a case, the selected 1/ε0 data records in data set C is the core-set. At step 270 the computerized system may output the core-set. In such case, the output may be in any digital computer-readable format, known for a person having skills in the art.

Figure 3:
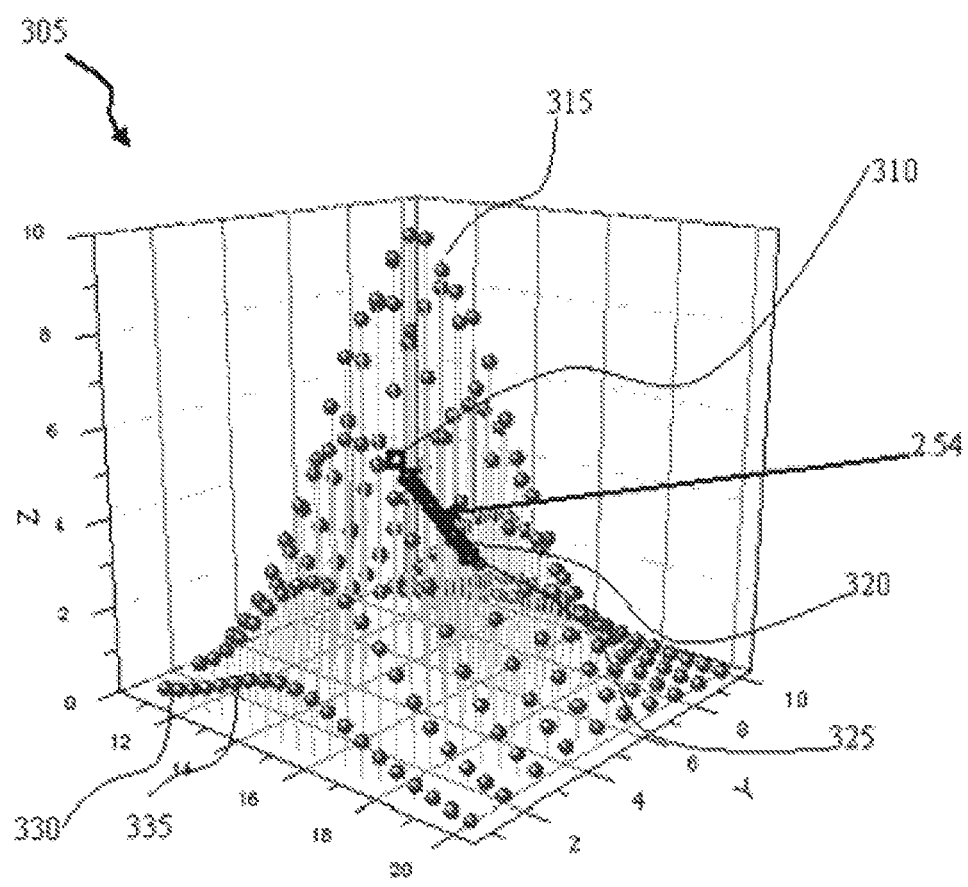
FIG. 3 depicts a clustering in two dimensional of income data with one cluster, according to exemplary embodiments of the present invention.

FIG. 3 depicts a clustering in three (3) dimensional of incoming data with one cluster, according to exemplary embodiments of the present invention. FIG. 3 shows a cluster-graph 305 comprising one cluster 315 with a centroid 310 which can be formed by capturing and arranging information, as aforementioned. The centroid 310 represents the center of mass of a cluster 315 wherein the maximum squared Euclidean distance from the centroid 310, represented by the threshold distance 320 is equal to 2.54. In such cases, the Euclidean distance and the threshold distance 320 may be numeric values representing the distance from the centroid. The cluster-graph 305 also comprises a data record 325 located at a threshold distance 320 from the centroid 310. In such cases, the data records with distances which are larger than the maximum squared Euclidean distance, represented by the threshold distance 320 may fall outside of the clusters 315. For example, the data records 330, and 335 may fall outside the cluster 315. The threshold distance 320 can be utilized to present a case, wherein a computerized system configured to choose a set of data records P in the cluster 315, may choose data records characterized with a distance to the centroid 310 which is not greater than the threshold distance 320. In such a case, data records 330, and 335 may remain out of the set of data records P.

Figure 4:
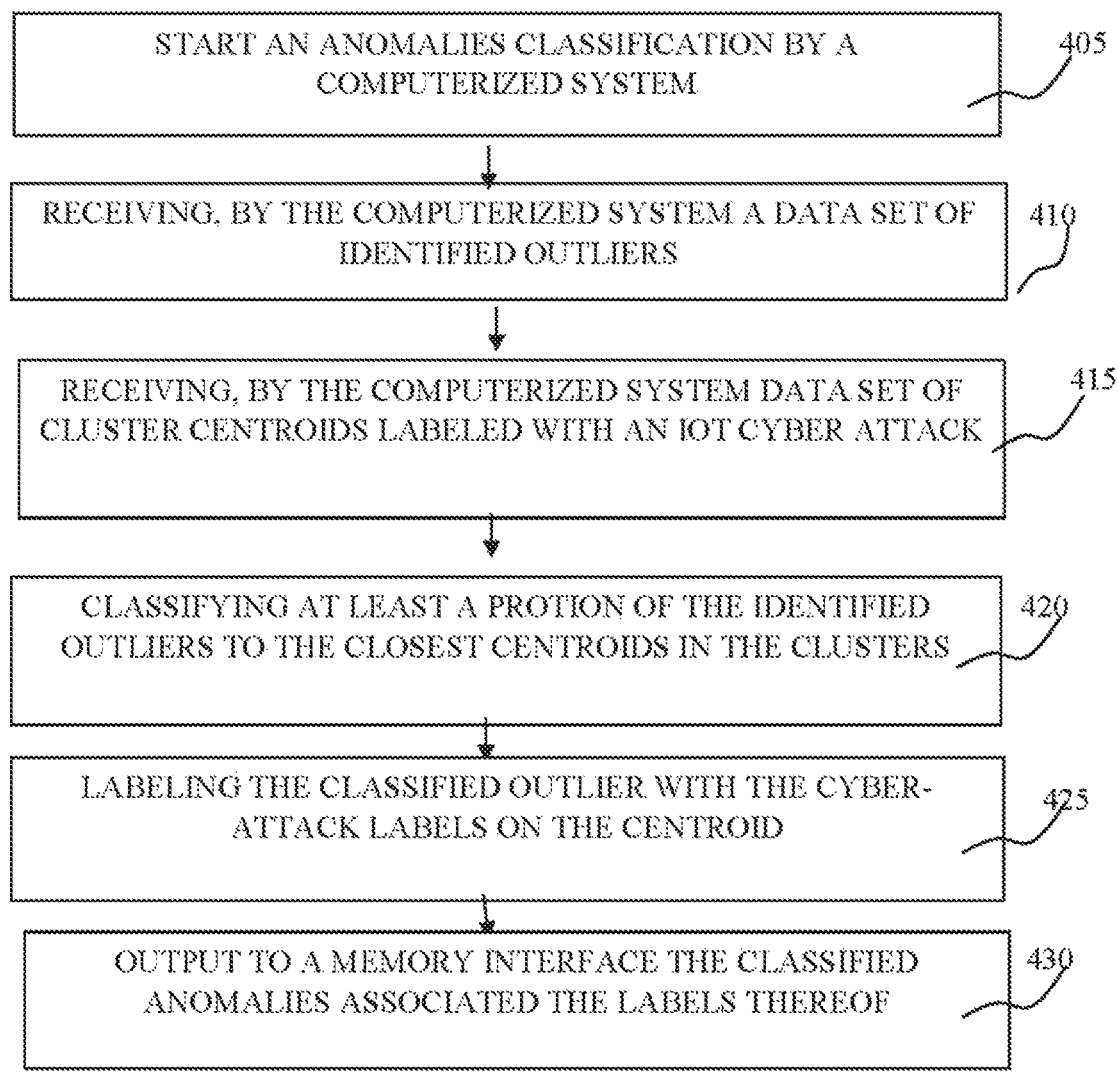
FIG. 4 discloses a computerized process operable by a computerized system for classifying anomalies and label thereof with cyberattacks, according to exemplary embodiments of the present invention.

FIG. 4 discloses a computerized process operable by a computerized system for classifying anomalies and label them with cyberattack categories, according to exemplary embodiments of the present invention. At step 405 a computerized system may initiate the process denoted as anomalies classification. In some cases, the initiation of the anomalies classification may comprise an initiation of the computerized system on a computerized device. At step 410 the computerized system receives a data set of identified outliers. In some cases, the outliers may be provided by a data set comprising data records defined as outliers by an outlier detection process. In some cases, such a process may be a computerized process which identifies outlier to be classified on a core-set, as explained below. At step 415 the computerized system may receive data set of cluster centroids labeled with IoT cyberattacks. In such cases the computerized system may receive data set comprising data records which are associated with specific cyberattacks.

At step 420 a classification process may occur to a portion of the identified outliers. The classification process may comprise comparison of the data records identified as outliers with the cluster centroids labeled with cyberattacks and thereby identify whether the identified outliers indicate cyberattacks. For example, a certain identified outlier may have a distance which can be essentially equal or approximated to a distance in the cluster centroids, wherein such a distance from the cluster centroids can be labeled with a specific cyberattack, e.g., "A denial of service attack". In such an exemplary case, the certain identified outlier which was compared with the distance from the cluster centroids may be labeled with a specific cyberattack. In some cases, the distance from a cluster centroid may be associated with a threshold value determining the proximity level required for being classified as a specific IoT cyberattacks. In some cases, such a classification process may be a computerized process conducted by a computerized system. In some cases, the computerized device may be configured with data bases and instructions for conducting such a classification process. In some other cases, such a classification process may be involved by a person or persons operating a computer-based system for identifying classes of anomalies according to predefined cyberattack types. For example, the identified groups of anomalies can be such as DDOS Attack, Device takeover, Device replication, Communication hijacking, Replay attack, Operational anomalies, and the like.

At step 425 a labeling process occurs for labeling the outlier according to the cyberattack types thereof. For example, a group of outliers may be labeled as Device takeover attack. In such cases, the labeling of the outlier may be associated with the captured data. Such data can be the device ID, the device protocol, and the like. At step 430 the computerized system may output to a memory interface, the labeled anomalies associated with the captured data, according to the cyberattack types thereof.

Figure 5:
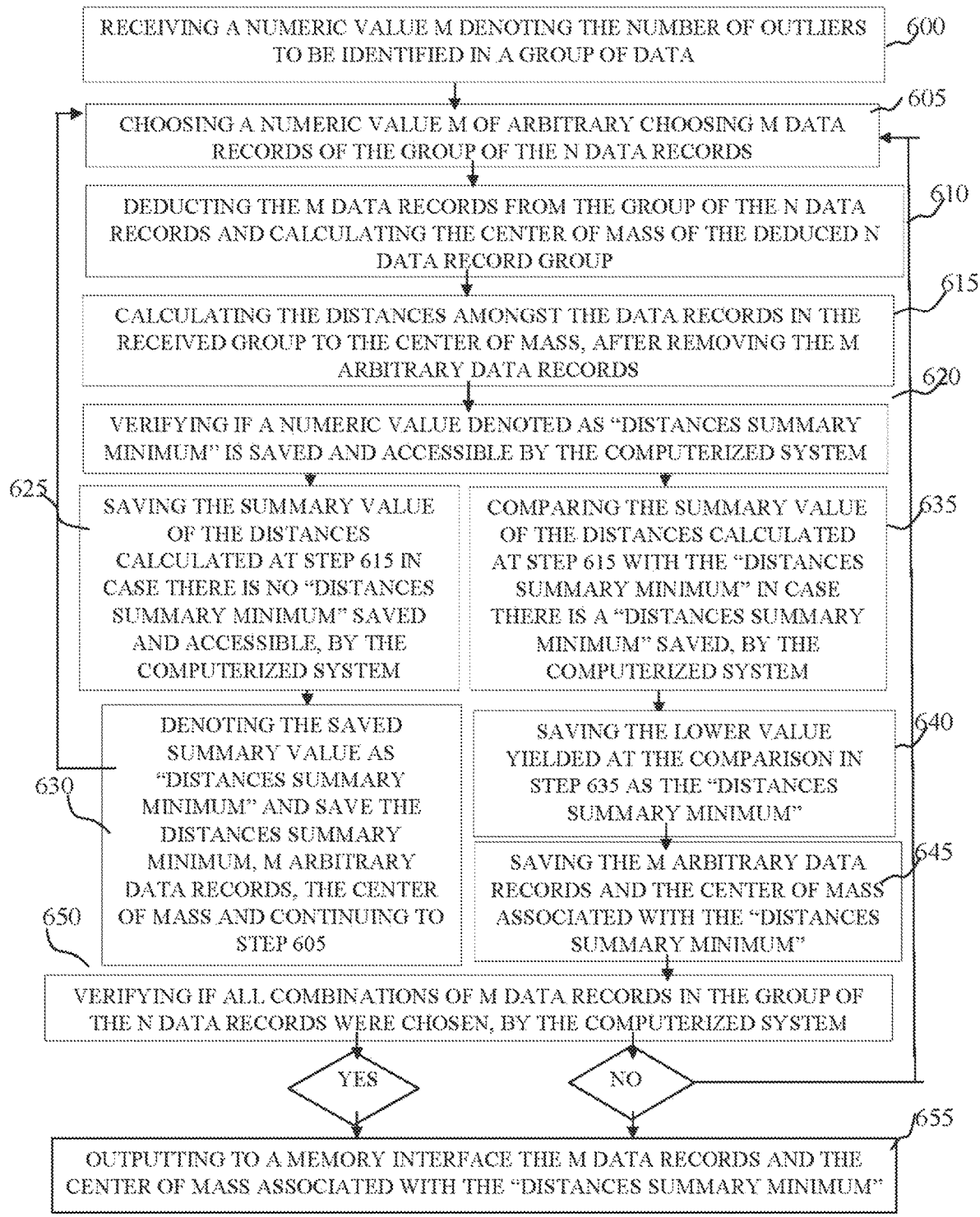
FIG. 5 discloses another optional outlier detection process for detecting outliers in a core-set, according to exemplary embodiments of the present invention.

FIG. 5 discloses another optional outlier detection process for detecting outliers in a core-set, according to exemplary embodiments of the present invention.

At step 600 a computerized system configured and programmed to carry out outlier detection process may receive a group of N data records by the computerized system, wherein N is a numeric value the group of N data records may be a core-set produced, as aforementioned. At step 605 the computerized system may receive a numeric value M and arbitrary choose M data records of the group of the N data records.

At step 610 the computerized system deducts the M data records from the group of the N data records and calculates the Center of Mass of the deducted N data record group, wherein the center of mass is calculated by considering the weights associated with the data records of the group.

At step 615 the computerized system calculates the distances amongst the data records in the received group to the center of mass, after removing M data records from the received group. For example, in case the N is equal to 10,000 such that the group of the data records comprises 10,000 data records, and the number M for arbitrary data records is 700, the computerized system may reduce 700 arbitrary data records from the 10,000 data record and calculate the distances of the remaining 9,300 data records to the center of mass. In such cases, the weights associated with the 9,300 data records may also be utilized in the distance calculation.

At step 620 the computerized system may verify if a numeric value denoted as "distances summary minimum" is saved and accessible by the computerized system. At step 625, the computerized system may save the summary value of the distances calculated at step 615 in case there is no "distances summary minimum" saved and accessible, by the computerized system. At step 630 the computerized system may denote the saved summary value as "distances summary minimum" and save the distances summary minimum, M arbitrary data records, the center of mass and continuing to step 605.

Step 635 discloses a case wherein there is a "distances summary minimum" saved, by the computerized system. In such a case, the computerized system may compare the summary value of the distances calculated at step 615 with the "distances summary minimum". At step 640 the computerized system may save the lower value yielded at the comparison in step 635 as the "distances summary minimum". At step 645 the computerized system may save the M arbitrary data records and the center of mass associated with the "distances summary minimum". At step 650 the computerized system may verify if all combinations of M data records in the group of the N data records were chosen, by the computerized system. In some cases, if not all combinations of M data records in the group of the N data records were chosen, the computerized system may go to step 605 for choosing another M data record of the group of the N data records, as aforementioned. In some other cases, if all combinations of M data records in the group of the N data records were chosen the computerized system continues to step 655. At step 655 the computerized system may output to a memory interface the M data records and the center of mass associated with the "distances summary minimum". In such case the M data records may be identified as outliers. In some cases, the M data records identified as outliers may be structured for undergo a process of classifying anomalies and label them with cyberattack categories, as aforementioned.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

We claim:

1. A method for real time detection of anomalies in a behavior of a plurality of Internet of things devices communicating over a communication network, the anomalies indicative of at least one cyberattack on a scale short execution time, the method comprising:
   receiving, by a computerized system, a first data set captured from the plurality of internet of things devices, wherein an entire first data set is defined by including all members of the first data set;
   performing an iterative procedure for generating, from the entire first data set, a core-set including a subset of weighted records of the first data set and outliers in the first data set, wherein the core-set is an approximation of the first data set and the core-set is in a size of an order of log (N) data records, and wherein the core set has a predefined error limit (epsilon);
   performing an outlier detection procedure to detect outliers in the core-set;
   receiving, by the computerized system, a second data set that comprises at least one cluster centroid associated with at least one internet of things cyberattacks label;
   determining distances between outliers that belong to the first data set and the at least one cluster centroid; and
   determining whether the first data set is indicative of the at least one cyberattack based on the distances;
   wherein the step of generating the core set from the entire first data set includes:
   calculating a normality score to each data record in the first data set in an iterative procedure,
   assigning probabilities to each data record in the first data based on the normality score, and
   selecting an order of log(N) data records from the first data set to the core-set based on the probabilities of each data record, wherein the core-set comprises the outliers.

2. The method according to claim 1, further comprising determining that a certain outlier is associated with a certain cyberattack when the distance between the certain outlier and a cluster centroid associated with the certain cyberattack is smaller than a certain threshold.

3. The method according to claim 1, wherein the generating from the first data set a core-set comprises searching for at least one outlier of the outliers that belong to the first data set.

4. The method according to claim 1, wherein the generating from the first data set a core-set comprises conducting a preprocessing procedure that comprises removing information of a format that differs from a predefined data format and cleaning noise.

5. The method according to claim 1, further comprising selecting a second plurality of records based on the probabilities of the first plurality of records to provide a second plurality of selected records, and assigning weights to the second plurality of selected records to provide a second plurality of weighted records.

6. The method according to claim 1, wherein the plurality of internet of things devices operate activities of the multiple internet of things devices.

7. The method according to claim 1, wherein the plurality of internet of things devices use one or more communication techniques.

8. The method according to claim 1, wherein the plurality of internet of things devices comprise at least one out of a session key used for communication, a port utilized for communication, an identifier of a target device communicated with one of the multiple internet of things devices, a number of TCP/IP packet sent, and a number of TCP/IP packets received.

9. A non-transitory computer readable medium that stores computer executable instructions for:
receiving, by a computerized system, a first data set captured from a plurality of internet of things devices, wherein an entire first data set is defined by including all members of the first data set;
performing an iterative procedure for generating from the entire first data set, a core-set-including a subset of weighted records of the first data set and outliers in the first data set, wherein the core-set is an approximation of the first data set and the core set is in a size of an order of log (N) data records, and wherein the core set has a predefined error limit (epsilon);
performing an outlier detection procedure to detect anomalies in a behavior of a plurality of internet of things devices communicating over a communication network, wherein the anomalies are indicative of at least one cyberattack on a scale short execution time;
receiving, by the computerized system, a second data set that comprises at least one cluster centroid associated with at least one internet of things cyberattacks label;
determining distances between outliers that belong to the first data set and the at least one cluster centroid; and
determining whether the first data set is indicative of at least one cyberattack based on the distances;
wherein the step of generating the core set from the entire first data set includes:
calculating a normality score to each data record in the first data set in an iterative procedure,
assigning probabilities to each data record in the first data based on the normality score, and
selecting an order of log(N) data records from the first data set to the core-set based on the probabilities of each data record, wherein the core-set comprises the outliers.

10. A computerized system that comprises a processing circuit and memory that are configured to cooperate to:
receive a first data set captured from a plurality of internet of things devices, wherein the first data set is raw data in a certain size (N), wherein an entire first data set is defined by including all members of the first data set;
perform an iterative procedure to generate from the entire first data set, a core-set-including a subset of weighted records of the first data set and outliers in the first data set, wherein the core-set is an approximation of the first data set and the core set is in a size of an order of log(N) data records, and wherein the core set has a predefined error limit (epsilon);
perform an outlier detection procedure to detect anomalies in a behavior of a plurality of internet of things devices communicating over a communication network, wherein the anomalies are indicative of at least one cyberattack on a scale short execution time;
receive a second data set that comprises at least one cluster centroid associated with at least one internet of things cyberattacks label;
determine distances between outliers that belong to the first data set and the at least one cluster centroid; and
determine whether the first data set is indicative of at least one cyberattack based on the distances;
wherein the step of generating the core set from the entire first data set includes:
calculating a normality score to each data record in the first data set in an iterative procedure,
assigning probabilities to each data record in the first data based on the normality score, and
selecting an order of log(N) data records from the first data set to the core-set based on the probabilities of each data record, wherein the core-set comprises the outliers.

* * * * *